United States Patent
Hetz et al.

(10) Patent No.: US 10,403,143 B2
(45) Date of Patent: Sep. 3, 2019

(54) TRAFFIC MONITORING SYSTEM FOR MONITORING A TRAFFIC AREA

(71) Applicant: SIEMENS MOBILITY GMBH, Munich (DE)

(72) Inventors: Julia Hetz, Munich (DE); Thomas Jell, Munich (DE); Florian Poprawa, Munich (DE); Uwe Reuter, Berlin (DE); Dirk Wischeropp, Munich (DE); Dominik Zoeke, Nuremberg (DE); Marcus Zwick, Moosach (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/548,494

(22) PCT Filed: Jan. 28, 2016

(86) PCT No.: PCT/EP2016/051798
§ 371 (c)(1),
(2) Date: Aug. 3, 2017

(87) PCT Pub. No.: WO2016/124476
PCT Pub. Date: Aug. 11, 2016

(65) Prior Publication Data
US 2018/0240341 A1    Aug. 23, 2018

(30) Foreign Application Priority Data

Feb. 3, 2015 (DE) .................... 10 2015 201 810

(51) Int. Cl.
| | | |
|---|---|---|
| *B60Q 1/48* | (2006.01) | |
| *G08G 1/14* | (2006.01) | |
| *G08G 1/0968* | (2006.01) | |
| *G08G 1/0969* | (2006.01) | |
| *G08G 1/13* | (2006.01) | |
| *H05B 37/02* | (2006.01) | |
| *B60L 53/30* | (2019.01) | |
| *B60L 53/60* | (2019.01) | |
| *B60L 53/68* | (2019.01) | |

(52) U.S. Cl.
CPC ............. *G08G 1/144* (2013.01); *B60L 53/30* (2019.02); *B60L 53/305* (2019.02); *B60L 53/60* (2019.02); *B60L 53/68* (2019.02); *G08G 1/0969* (2013.01); *G08G 1/096838* (2013.01); *G08G 1/096888* (2013.01); *G08G 1/13* (2013.01); *G08G 1/141* (2013.01); *G08G 1/147* (2013.01); *G08G 1/149* (2013.01); *H05B 37/0227* (2013.01); *H05B 37/0272* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 30/12* (2013.01)

(58) Field of Classification Search
CPC ............. G08G 1/144; G08G 1/096838; G08G 1/0969; G08G 1/096888; G08G 1/13; G08G 1/149; G08G 1/147; H05B 37/0272; H05B 37/0227
USPC ...................................... 340/932.2
See application file for complete search history.

(56) References Cited

U.S. PATENT DOCUMENTS

| | | |
|---|---|---|
| 6,282,488 B1 | 8/2001 | Castor et al. |
| 9,168,842 B2 | 10/2015 | Kirchner et al. |
| 2006/0250278 A1 | 11/2006 | Tillotson et al. |
| 2012/0150360 A1* | 6/2012 | Kirchner ............. B60L 11/1816 700/297 |
| 2013/0265174 A1* | 10/2013 | Scofield ................. G01C 21/34 340/932.2 |
| 2014/0210646 A1 | 7/2014 | Subramanya |

FOREIGN PATENT DOCUMENTS

| | | | | |
|---|---|---|---|---|
| CN | 202472965 U | * | 10/2012 | ............. G08G 1/142 |
| DE | 69215842 T2 | * | 5/1997 | ............. G07B 15/04 |
| DE | 102004032346 A1 | | 1/2006 | |
| EP | 0883873 B1 | | 12/1999 | |
| FR | 2770015 A1 | | 4/1999 | |
| KR | 101266279 B1 | * | 5/2013 | |
| WO | 2011045249 A2 | | 4/2011 | |

\* cited by examiner

*Primary Examiner* — Tanmay K Shah
(74) *Attorney, Agent, or Firm* — Laurence Greenberg; Werner Stemer; Ralph Locher

(57) ABSTRACT

A traffic monitoring system for a traffic area with parking surfaces for vehicles or a freely arrangeable row of vehicles includes overhead radar sensors oriented towards the area for capturing a chronological sequence of digital radar images thereof. An analyzing unit detects vehicles parked on the area and ascertains locations and dimensions thereof from the captured sequence and determines an occupancy state of the surfaces from a data comparison of the ascertained locations and dimensions of parked vehicles with configured geodata of surfaces. The parking surface is occupied or free for a vehicle, and a parking surface for a freely arrangeable row of vehicles is occupied or provided by one or more free parking spaces. An image output unit outputs a map view of the area with marked surfaces and the current occupancy state of the surfaces. The traffic monitoring system allows a more effective monitoring of the area.

18 Claims, No Drawings

TRAFFIC MONITORING SYSTEM FOR MONITORING A TRAFFIC AREA

BACKGROUND OF THE INVENTION

Field of the Invention

The invention relates to a traffic monitoring system for monitoring a traffic area having parking areas for parking vehicles.

With population growth in cities and conurbations, the number of vehicles also increases there. However, for most of the time, private vehicles are parked in a stationary manner in parking areas. Because of the limited traffic areas available in the center, towns and cities often cannot provide sufficient parking, resulting in a considerable volume of traffic caused solely by vehicles searching for a vacant parking space. This is accompanied by increased infringement of parking regulations applicable to parking areas, particularly also in no-parking zones, which on the one hand may pose a safety risk and, on the other, thwarts urban transport policy whereby residents, so-called green vehicles and user groups with special needs, e.g. wheelchair users, are accorded special privileges for parking their vehicles. A possible means of controlling the capacity utilization of parking areas is to impose parking charges, to limit the permitted parking time or to allow parking at a particular time of day only. In each case, in terms of effective and economical parking management on the part of the operator, there is an interest in monitoring and checking compliance with applicable parking regulations over and above routine inspections in which traffic wardens personally visit the parking areas.

For monitoring a parking area for an individual vehicle, vehicle detectors are known which automatically detect the state of occupancy. For example, ultrasonic sensors suspended from the ceilings of parking garages are known which can scan the parking bay below for the presence of a vehicle. On uncovered parking lots, on marginal strips or on the curb, where vehicles are also to be parked in an orderly arranged row, magnetic field sensors set into the surface of the traffic area can be used to detect occupancy of the row of individual parking areas.

SUMMARY OF THE INVENTION

The object of the invention is to provide a traffic monitoring system allowing more effective monitoring of a traffic area comprising a plurality of parking areas for respective individual vehicles and/or parking areas for a freely arrangeable row of vehicles.

This object is achieved according to the invention by a traffic monitoring system for monitoring a traffic area having parking areas for respective individual vehicles and/or parking areas for a freely arrangeable row of vehicles, comprising one or more radar sensors which are disposed overhead and trained on the traffic area such that a sequence of digital radar images of the traffic area can be captured, an evaluation unit which is designed to detect vehicles parked in the traffic area from the captured sequence of radar images and to ascertain their locations and dimensions and, by comparing the data of the ascertained locations and dimensions of parked vehicles with configured geodata of the parking areas, to determine the occupancy states thereof, wherein the state of occupancy of a parking area for an individual vehicle is either occupied or vacant, and wherein the state of occupancy of a parking area for a freely arrangeable row of vehicles is either occupied or determined by one or more vacant parking spaces, and an image output unit which is designed to display a map of the traffic area with marked parking areas and the current occupancy states thereof.

DESCRIPTION OF THE INVENTION

A traffic monitoring system for monitoring a traffic area having parking areas for individual vehicles and/or parking areas for a freely arrangeable row of vehicles comprises one or more radar sensors. The radar sensors are disposed overhead and trained on the traffic area such that a sequence of digital radar images of the traffic area can be captured. Directional radar beams emitted by the radar sensor scan the surface of the traffic area and of objects located thereon, such as parked or moving vehicles, wherein the delays between emission of the beam and reception of the reflected beam component are measured and digital radar images are generated therefrom. The traffic monitoring system also comprises an evaluation unit which is designed to detect vehicles parked in the traffic area from the acquired sequence of radar images and to ascertain their locations and dimensions and to determine the states of occupancy of the parking areas from a data comparison of the ascertained locations and dimensions of parked vehicles with configured geodata of the parking areas. The geodata can be geographic coordinates which define, for example, the delimitation of parking areas which is actually constituted by a road marking or curbstone or exists only notionally in the roadside region. From the relation to the geodata for disposing and aligning a radar sensor, an association between locations on the acquired radar images and the actual traffic area can be produced. The state of occupancy of a parking area for an individual vehicle is either occupied or vacant, whereas the state of occupancy of a parking area for a freely arrangeable row of vehicles is either occupied or determined by one or more vacant parking spaces. In the latter case, the state of occupancy can also be additionally determined by the number, size and position of vacant parking spaces. The traffic monitoring system also comprises an image output unit which is designed to show a map of the traffic area with marked parking areas and the current states of occupancy thereof. Compared to known occupancy sensors which only monitor individual parking areas in each case, overhead radar sensors can scan a larger traffic area comprising a plurality of parking areas. This enables the costs for procurement and installation of the required monitoring sensors to be reduced. A radar sensor beam, e.g. of an FMCW radar, scans a large proportion, or the entirety, of the traffic area, i.e. the parking areas and also zones outside the parking areas. Radar technology has the advantage of robust detection results, particularly in comparison to video technology which is heavily dependent on the light and weather conditions obtaining. Radar sensors disposed overhead are much less frequently damaged by vandalism or by accidents than ground-level sensors and therefore have lower life-cycle costs. The evaluation unit and the image output unit can be disposed in a monitoring center of the traffic monitoring system.

In an advantageous embodiment, the traffic monitoring system according to the invention comprises a street lighting system having one or more streetlights for illuminating the traffic area, wherein a radar sensor is incorporated in a streetlight. This provides traffic area monitoring that is invisible to road users, and without the urban landscape being impaired by additional visible infrastructure equipment. When installing a new streetlight or converting the lamps to LED technology, the radar sensors can be incorporated without additional assembly costs. The part of the traffic area monitored by a radar sensor can be more or less congruent with the area illuminated by the streetlight, so that the distance between adjacent streetlights is well suited for comprehensive scanning of the traffic area by radar sensors incorporated therein.

The streetlight's electrical control gear is preferably disposed in a streetlight support system, particularly in a pole. The radar sensor can then be disposed in the available space inside the housing of the streetlamp, which space has until now accommodated the electrical control gear. The housing or the transparent outer casing can then be matched to the design of the streetlight and be made of a material that is permeable to radar beams.

For electrical supply, a radar sensor of the traffic monitoring system according to the invention is advantageously connected to the streetlight's power supply lines. This obviates the need for additional supply lines and a dedicated energy source, such as a solar module with energy storage device, for the radar sensor, thereby reducing procurement and installation costs. However, the radar sensor can also be operated from a solar module if required.

A radar sensor of traffic monitoring system according to the invention is designed for data communication with another radar sensor and/or the evaluation and image output unit via power lines. By using so-called PLC (Power Line Communication) technology, additional data communication lines can be dispensed with, thereby further reducing installation costs. Alternatively, wireless data communication can also be used.

In a preferred embodiment of the traffic monitoring system according to the invention, a streetlight has a controllable switching device for switching on and/or switching off and/or dimming a lamp of the streetlight. Here the evaluation unit is designed to detect vehicles and/or cyclists and/or pedestrians moving on the traffic area from the acquired sequence of radar images and to determine their current location. From a data comparison of the determined locations with stored geodata of roadways and/or cycle tracks and/or sidewalks, the evaluation unit is then further designed to identify streetlights assigned to the locations and to control the switching devices thereof. For example, if no movement is detected on the traffic area, the associated street lighting can be switched off or dimmed down in order to save energy. Where and as long as moving road users are detected, streetlights can be switched on or dimmed up in order to increase road safety and personal security.

In an advantageous embodiment, the traffic monitoring system according to the invention comprises one or more ground sensors each assigned to a parking area provided for parking an individual vehicle and which are each designed to ascertain the state of occupancy of the assigned parking area. The overhead radar sensors are designed to insert the occupancy information of the ground sensors into the radar image of the traffic area. This enables ground sensors already present to be incorporated into the traffic monitoring system according to the invention. However, parking areas which are shaded from radar sensors by structures or vegetation can also be selectively equipped with ground sensors. Possible ground sensors are occupancy sensors disposed below or above ground level of the traffic area which are based on magnetic field, ultrasonic, infrared or video technology and can detect the state of occupancy of an assigned parking area.

In a preferred embodiment, the traffic monitoring system according to the invention comprises a configuration unit by means of which geodata of parking areas and/or roadways and/or cycle tracks and/or sidewalks and/or no-parking areas of the traffic area as well as parking regulations applicable to parking areas can be configured in the evaluation unit. Geodata can be simply imported by means of the configuration unit, e.g. from urban planning tools, for the parking areas, roadways, cycle tracks and sidewalks. The configuration unit can also be used in the traffic monitoring system to track constructional changes to the traffic area. No-parking areas, e.g. in the vicinity of fire department access roads, emergency exits, and similar can likewise be simply configured. Parking regulations applicable to the parking areas, e.g. in respect of time of day, parking duration or vehicle categories can likewise be implemented via the configuration unit. Configuration is assisted by an image output unit which is designed to display a map of the traffic area showing parking regulations assigned to marked parking areas, roadways, cycle tracks, sidewalks, no-parking and parking areas.

A parking area to which parking charge regulations apply is preferably assigned a payment system for the payment of parking fees. The payment system can consist of pay and display machines, parking meters, pay stations or mobile phones, and, linked to the evaluation unit, an administrative center in which current payment information for the parking area is provided. By comparing the occupancy states with the payment information, said evaluation unit is designed to ascertain whether a vehicle parked in the parking area is in contravention of the parking regulations. For example, a vehicle might be parked in a pay-parking area, but there is no information of a parking fee having been paid. In addition, it is possible to determine the length of time of the contravention.

A parking area designated for EV charging as a parking regulation is likewise preferably assigned a charging system for charging a vehicle energy storage device. The charging system can have a charging post disposed in the region of the parking area and a charging system center connected thereto to which charging information as to whether a charging operation is currently taking place in relation to the parking area is transmitted. By comparing the occupancy states with the charging information, the evaluation unit is designed to ascertain whether a vehicle parked in the parking area is in contravention of the parking regulations. If such a parking violation is detected, the traffic monitoring system according to the invention allows consistent penalty enforcement, so that the parking areas provided for charging energy storage devices of electrically powered vehicles will be less subject to wrongful occupancy once a learning effect has taken place. This in turn increases the capacity utilization of the charging infrastructure created for E-vehicles.

A parking area where parking regulations require that a special authorization be produced is also preferably assigned a reading device for reading out a special authorization from a transponder deposited in the parked vehicle. Thus special authorizations for residents or wheelchair users can be stored on an RFID transponder card by means of an appropriate identification code which can be read by an RFID reading device. The current readout information for the parking area which is provided in the reading devices is transmitted to the evaluation unit which is designed to ascertain whether a vehicle parked in the parking area is in contravention of the parking regulations by comparing the occupancy states with the readout information provided. If no special authorization at all, or no appropriate special authorization, can be read by reading device in respect of an occupied parking area, the vehicle occupying the parking area is committing a parking violation.

In another advantageous embodiment, the traffic monitoring system according to the invention comprises an enforcement unit by means of which a location of a vehicle currently parked in a no-parking zone and/or of a vehicle currently violating a parking regulation can be determined. The enforcement unit comprises an image output unit by means of which a map is displayed showing the traffic area with marked parking areas and/or no-parking zones and with the ascertained locations of current violations. In addition, the current duration of the parking violation can also be displayed. The enforcement unit can be disposed in a monitoring center of the traffic monitoring system, where enforcement staff has access to the image output unit. There the locations of parking violations currently occurring can be read off for patrols and optimized route planning in respect of travel distance and probability of catching the violator can be performed.

The enforcement unit of the traffic monitoring system according to the invention is preferably implemented as a mobile terminal with navigation unit and image output unit. By means of the image output unit, a map can be displayed which additionally shows the current location of the enforcement unit and a recommended route from the current location of the enforcement unit to an ascertained location of an offending vehicle. This increases the flexibility of the traffic monitoring system, as patrols need not necessarily start out from a monitoring center. In addition, the route planning for a patrol is optimized by the automatic routing recommendation and independently of the local knowledge of enforcement staff.

In another preferred embodiment, the traffic monitoring system according to the invention comprises a statistical unit by means of which occupancy statistics for the parking areas according to time of day and/or day of the week and/or an event or roadworks calendar and/or applicable parking regulations can be compiled from particular occupancy states. In this way, capacity utilization information can be generated for parking areas in general and, in particular, for parking areas with EV charging system or subject to special authorizations. Above all, however, such occupancy statistics make it possible to ascertain the probability of finding a vacant parking area or a parking area having a free parking space on a particular calendar day at a particular time of day in the vicinity of a location of the traffic area of a town.

That is to say, the traffic monitoring system according to the invention preferably comprises a route planning system which is designed to calculate, from a predefinable starting point and destination, a route to be traveled at least partly by a vehicle and a travel time required for that purpose. A probability of finding a vacant parking area or a parking area with a free parking space at an expected arrival time is calculated from the statistical unit's occupancy statistics of parking areas assigned to the destination. When calculating the journey time, the route planning system is designed to allow for a parking search time dependent on the probability of finding parking and the time required to walk from the parking area to the destination. This enables in particular intermodal journey planning systems to provide more accurate travel times which includes the current parking space availability in the vicinity of an intended destination. In many cases this could influence the travel decision in favor of public transportation.

The route planning system is preferably designed to determine vacant parking areas in the vicinity of the current location of the vehicle during the vehicle journey and then offer them as interchange points if there is a nearby public transportation stop providing a connection to another stop in the vicinity of the destination. A route planning system user can here be advantageously informed about interchange options during the journey if, for example, there are only a small number of vacant parking areas at the destination, but a vacant parking area is available at a nearby tram stop.

The route planning system is also preferably designed to offer a possible interchange point only if changing to public transportation reduces the travel time. This option could be activated or deactivated by the route planning system user.

In addition, the route planning system is also designed to determine a changed route from the vehicle's current location to the vacant parking area following acceptance of the offered interchange point. This enables the driver to find the vacant parking area quickly.

The invention claimed is:

1. A traffic monitoring system for monitoring a traffic area having at least one of parking areas for respective individual vehicles or parking areas for a freely arrangeable row of vehicles, the system comprising:
    at least one radar sensor disposed overhead and trained on the traffic area for capturing a sequence of digital radar images of the traffic area, said at least one radar sensor emitting a radar sensor beam scanning the parking areas and zones outside the parking areas;
    an evaluation unit configured to detect vehicles parked in the traffic area from the captured sequence of radar images, to ascertain locations and dimensions of the parked vehicles and to determine occupancy states of the parking areas by comparing data of the ascertained locations and dimensions of parked vehicles with configured geodata of the parking areas;
    a parking area for an individual vehicle having a state of occupancy being either occupied or vacant;
    a parking area for a freely arrangeable row of vehicles having a state of occupancy being either occupied or determined by one or more vacant parking spaces; and
    an image output unit configured to display a map of the traffic area with marked parking areas and current occupancy states of the marked parking areas.

2. The traffic monitoring system according to claim 1, which further comprises a street lighting system including at least one streetlight for illuminating the traffic area, said at least one radar sensor being incorporated in said at least one streetlight.

3. The traffic monitoring system according to claim 2, wherein said at least one streetlight includes a support system or a pole and electrical control gear disposed in said support system or pole.

4. The traffic monitoring system according to claim 2, wherein said at least one streetlight includes power supply lines for electrical supply, said at least one radar sensor being connected to said power supply lines.

5. The traffic monitoring system according to claim 4, which further comprises energy supply lines, said at least one radar sensor being configured for data communication with at least one of another radar sensor or said evaluation unit over said energy supply lines.

6. The traffic monitoring system according to claim 2, wherein:
    said at least one streetlight has a controllable switching device for at least one of switching on or switching off or dimming a lamp of said at least one streetlight; and
    said evaluation unit is configured to detect at least one of vehicles or cyclists or pedestrians moving on the traffic areas from the captured sequence of radar images, to ascertain the current locations of the vehicles or cyclists or pedestrians, to identify said at least one streetlight assigned to the locations and to control said switching devices of said at least one streetlight by comparing data of the ascertained locations with stored geodata of at least one of roadways or cycle tracks or sidewalks.

7. The traffic monitoring system according to claim 1, which further comprises at least one ground sensor assigned to a respective parking area for an individual vehicle and configured to ascertain the state of occupancy of the assigned parking area.

8. The traffic monitoring system according to claim 1, which further comprises a configuration unit for configuring geodata of at least one of parking areas or roadways or cycle tracks or sidewalks or no-parking areas of the traffic area and parking regulations applicable to the parking areas, in said evaluation unit.

9. The traffic monitoring system according to claim 8, which further comprises:
   a payment system assigned to a parking area to which parking charge regulations apply for payment of parking fees, said payment system containing current payment information relating to the parking area;
   said evaluation unit being configured to ascertain whether a vehicle parked in the parking area is in contravention of the parking regulations by comparing the occupancy states with the payment information.

10. The traffic monitoring system according to claim 9, which further comprises:
   a charging system for charging a vehicle energy storage device, said charging system being assigned to a parking area designated for EV charging as a parking regulation, and said charging system containing current charging information relative to the parking area; and
   said evaluation unit being configured to ascertain whether a vehicle parked in the parking area is in contravention of the parking regulations by comparing the occupancy states with the charging information.

11. The traffic monitoring system according to claim 8, which further comprises:
   a reading device assigned to a parking area where parking regulations require that a special authorization be produced, said reading device reading out a special authorization from a transponder deposited in the parked vehicle, and said reading device containing current readout information relating to the parking area; and
   said evaluation unit being configured to ascertain whether a vehicle parked in the parking area is in contravention of the parking regulations by comparing the occupancy states with the readout information.

12. The traffic monitoring system according to claim 8, which further comprises:
   an enforcement unit for determining a location of at least one of a vehicle currently parked in a no-parking zone or a vehicle currently violating a parking regulation; and
   an image output unit for displaying a map showing the traffic area with at least one of marked parking areas or no-parking zones and with ascertained locations of current violations.

13. The traffic monitoring system according to claim 12, wherein said enforcement unit is implemented as a mobile terminal with a navigation unit and an image output unit for displaying a map additionally showing a current location of said enforcement unit and a recommended route from said current location of said enforcement unit to an ascertained location of an offending vehicle.

14. The traffic monitoring system according to claim 1, which further comprises a statistical unit for compiling occupancy statistics for the parking areas from particular occupancy states according to at least one of time of day or day of the week or an event or roadwork calendar or applicable parking regulations.

15. The traffic monitoring system according to claim 14, which further comprises:
   a route planning system configured to calculate, from a predefinable starting point and destination, a route to be traveled at least partly by a vehicle and a travel time required for traveling the route;
   said route planning system calculating a probability of finding a vacant parking area or a parking area with a free parking space at an expected arrival time from the occupancy statistics of parking areas assigned to the destination; and
   said route planning system being configured to allow for a parking search time in dependence on a probability of finding parking and a time required to walk from the parking area to the destination, for calculating a journey time.

16. The traffic monitoring system according to claim 15, wherein said route planning system is configured to determine vacant parking areas in a vicinity of a current location of the vehicle during the journey and to then offer the vacant parking areas as interchange points if there is a nearby public transportation stop providing a connection to another stop in a vicinity of the destination.

17. The traffic monitoring system according to claim 16, wherein said route planning system is configured to offer a possible interchange point only if changing to public transportation reduces the travel time.

18. The traffic monitoring system according to claim 16, wherein said route planning system is configured to determine a changed route from the current location of the vehicle to the vacant parking area following acceptance of the offered interchange point.

* * * * *